(12) United States Patent
Dancy

(10) Patent No.: US 12,434,612 B2
(45) Date of Patent: Oct. 7, 2025

(54) VEHICLE FLOOR MAT ASSEMBLY

(71) Applicant: Regina Dancy, Indianapolis, IN (US)

(72) Inventor: Regina Dancy, Indianapolis, IN (US)

( * ) Notice: Subject to any disclaimer, the term of this patent is extended or adjusted under 35 U.S.C. 154(b) by 445 days.

(21) Appl. No.: 18/126,981

(22) Filed: Mar. 27, 2023

(65) Prior Publication Data
US 2024/0326674 A1 Oct. 3, 2024

(51) Int. Cl.
*B60N 3/04* (2006.01)
*B60Q 7/00* (2006.01)

(52) U.S. Cl.
CPC .............. *B60N 3/048* (2013.01); *B60N 3/046* (2013.01); *B60Q 7/005* (2013.01)

(58) Field of Classification Search
CPC .......... B60N 3/04; B60N 3/044; B60N 3/046; B60N 3/048; B60Q 1/26; B60Q 7/00; B60Q 7/005
USPC ...................................................... 296/97.23
See application file for complete search history.

(56) References Cited

U.S. PATENT DOCUMENTS

| | | | | |
|---|---|---|---|---|
| 3,426,343 | A * | 2/1969 | Carlson | B60Q 7/00 362/186 |
| 4,129,346 | A | 12/1978 | Hofman | |
| 5,076,196 | A * | 12/1991 | Chan | B60Q 1/52 116/28 R |
| D323,115 | S | 1/1992 | Kelsey | |
| 5,236,753 | A * | 8/1993 | Gaggero | B60N 3/044 296/97.23 |
| 5,273,160 | A | 12/1993 | Malvasio | |
| 5,303,668 | A * | 4/1994 | Huang | G08G 1/0955 116/63 P |
| 6,619,474 | B2 | 9/2003 | Montgomery | |
| 7,445,113 | B2 | 11/2008 | Wilhelm | |
| 8,206,002 | B1 * | 6/2012 | Olson | F21V 33/00 362/153.1 |
| 8,328,013 | B2 | 12/2012 | Stevens | |
| 9,533,466 | B2 * | 1/2017 | Assil | B60N 3/048 |
| 10,442,076 | B1 * | 10/2019 | Auccello | F21V 33/0076 |
| 2002/0028313 | A1 * | 3/2002 | Blum | G09F 19/228 15/104.002 |
| 2004/0088789 | A1 * | 5/2004 | Mitchell | A47G 9/062 5/420 |
| 2004/0237877 | A1 * | 12/2004 | Huang | G09F 13/16 116/63 T |
| 2006/0066064 | A1 | 3/2006 | Hardy | |
| 2012/0141725 | A1 * | 6/2012 | Jung | B60N 3/046 428/100 |

(Continued)

FOREIGN PATENT DOCUMENTS

WO WO2010020259 2/2010

*Primary Examiner* — Gregory A Blankenship

(57) ABSTRACT

A vehicle floor mat assembly includes a front floor mat that is positionable on a floor of a vehicle. The front floor mat has a plurality of reflective elements each integrated into the front floor mat for reflecting light. The floor mat is rollable into a cone having each of the plurality of reflective elements exposed to facilitate the reflective elements to enhance visibility of the cone for oncoming traffic. A back floor mat is positionable on the floor of the vehicle and the back floor mat has a reflective surface to reflect light. A pair of straps is each coupled to the back floor mat for wearing over a respective one of a user's shoulders. In this way the reflective surface enhances visibility of the user to oncoming traffic.

10 Claims, 6 Drawing Sheets

(56) References Cited

U.S. PATENT DOCUMENTS

| | | | |
|---|---|---|---|
| 2013/0168993 A1* | 7/2013 | Gramet | B60R 13/011 |
| | | | 296/39.1 |
| 2018/0134214 A1* | 5/2018 | Yoon | B60N 3/04 |
| 2018/0208129 A1* | 7/2018 | Mejia Barajas | B25H 5/00 |
| 2024/0326674 A1* | 10/2024 | Dancy | B60N 3/048 |
| 2025/0050795 A1* | 2/2025 | Ali | B60N 3/044 |

* cited by examiner

VEHICLE FLOOR MAT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to floor mat devices and more particularly pertains to a new floor mat device for directing traffic around a disabled vehicle on a roadway. The device includes a front floor mat that has a plurality of reflective elements and which can be rolled into a cone having the reflective elements being exposed. The cone can be positioned adjacent to a disabled vehicle on a roadway to direct oncoming traffic away from the disabled vehicle. The device includes a back floor mat that has a reflective surface and a pair of straps each attached to the back floor mat. The straps can be worn over a user's shoulders to facilitate the reflective surface to be displayed on the user's back to enhance visibility of the user.

(2) Description of Related Art Including Information Disclosed Under 37 CFR 1.97 and 1.98

The prior art relates to floor mat devices including a variety of modular floor mats for vehicles that include a plurality of parts that are interconnected to form a floor mat system and a floor mat that includes light emitters for enhancing the ornamental appeal of the floor mat. In no instance does the prior art disclose a floor mat device that includes a front floor mat with reflective elements and a fastener to facilitate the floor mat to be rolled into a cone and a back floor mat with shoulder straps and a reflective surface.

BRIEF SUMMARY OF THE INVENTION

An embodiment of the disclosure meets the needs presented above by generally comprising a front floor mat that is positionable on a floor of a vehicle. The front floor mat has a plurality of reflective elements each integrated into the front floor mat for reflecting light. The floor mat is rollable into a cone having each of the plurality of reflective elements exposed to facilitate the reflective elements to enhance visibility of the cone for oncoming traffic. A back floor mat is positionable on the floor of the vehicle and the back floor mat has a reflective surface to reflect light. A pair of straps is each coupled to the back floor mat for wearing over a respective one of a user's shoulders. In this way the reflective surface enhances visibility of the user to oncoming traffic.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
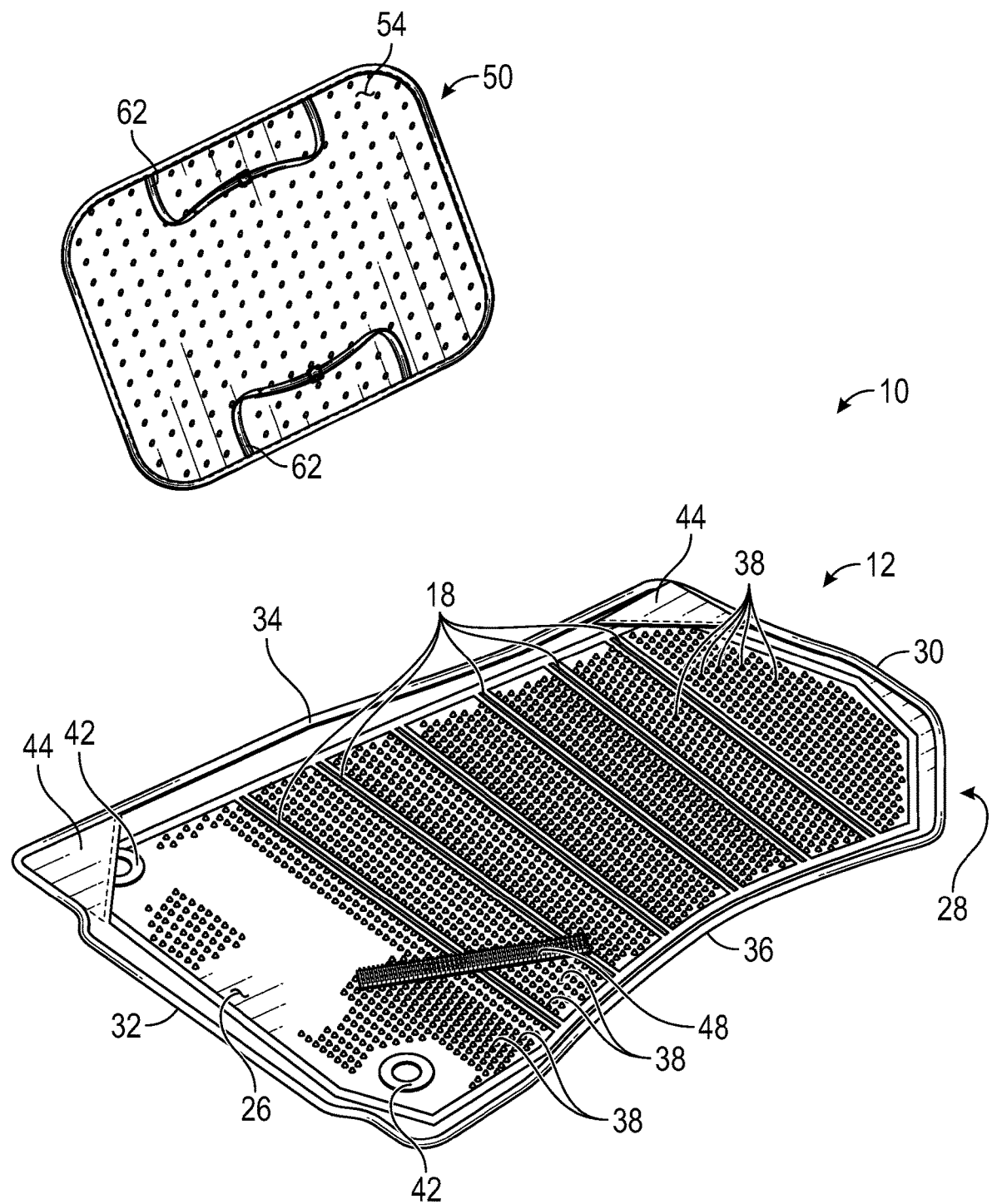
FIG. 1 is a bottom perspective view of a vehicle floor mat assembly according to an embodiment of the disclosure.
Figure 2:
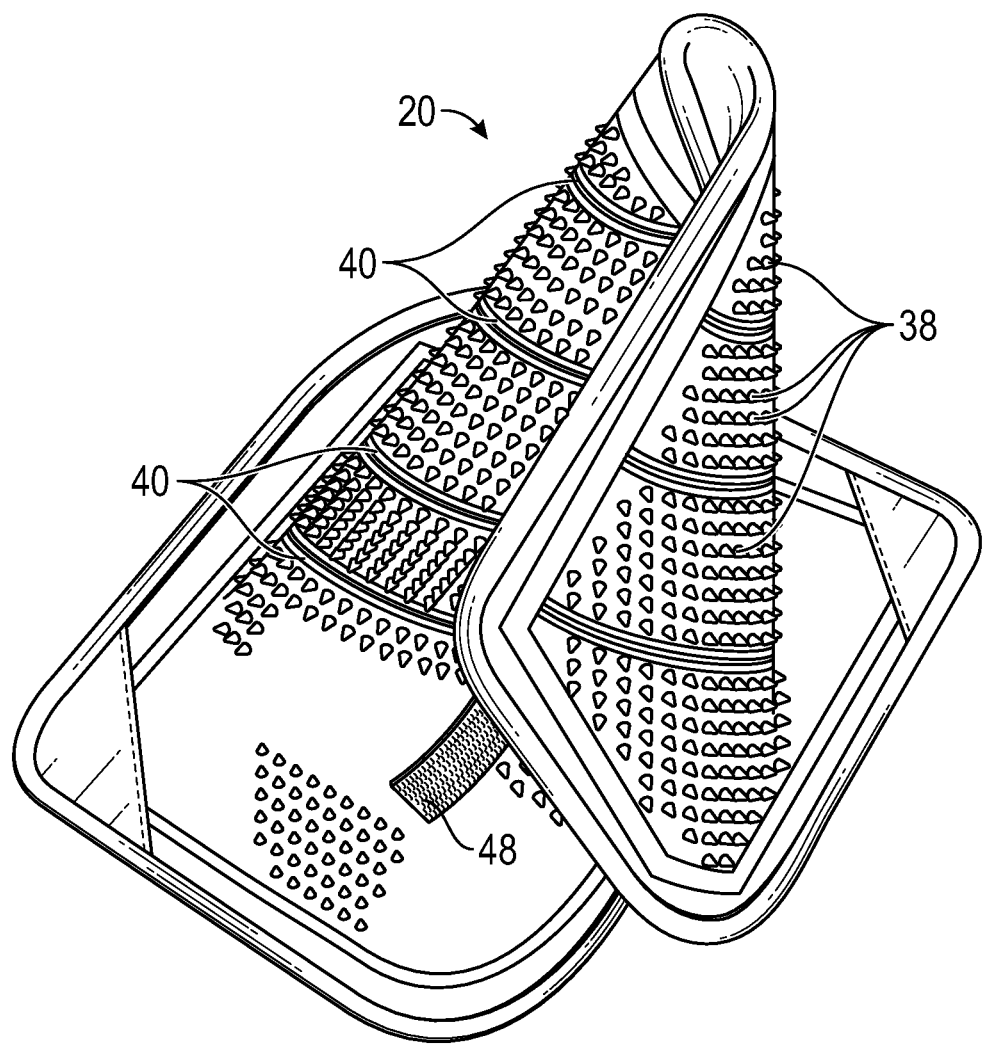
FIG. 2 is a perspective view of an embodiment of the disclosure showing a front floor mat rolled into a cone.
Figure 3:
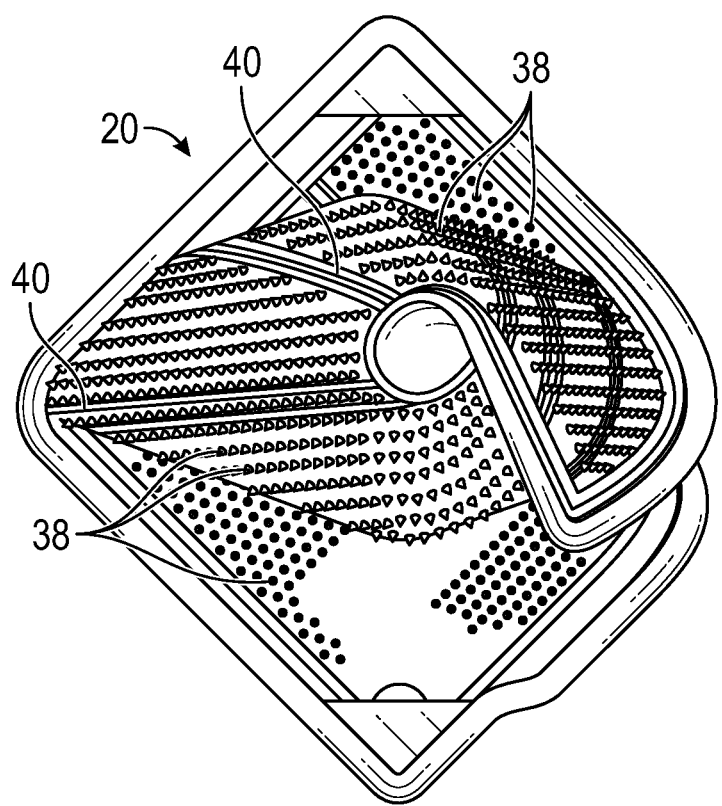
FIG. 3 is a top view of an embodiment of the disclosure showing a front floor mat rolled into a cone.
Figure 4:
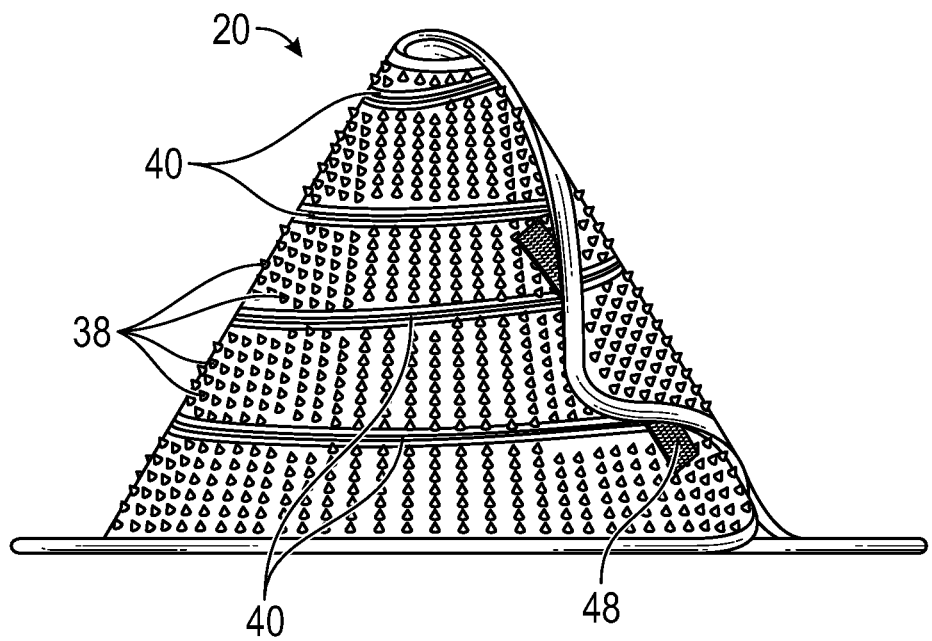
FIG. 4 is a front view of an embodiment of the disclosure showing a front floor mat rolled into a cone.
Figure 5:
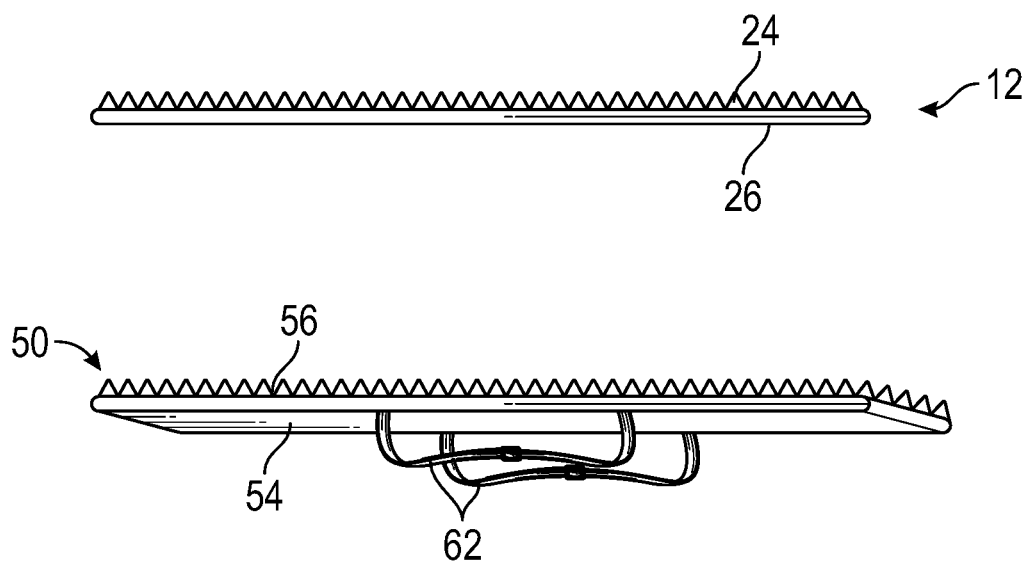
FIG. 5 is a front view of an embodiment of the disclosure.
Figure 6:
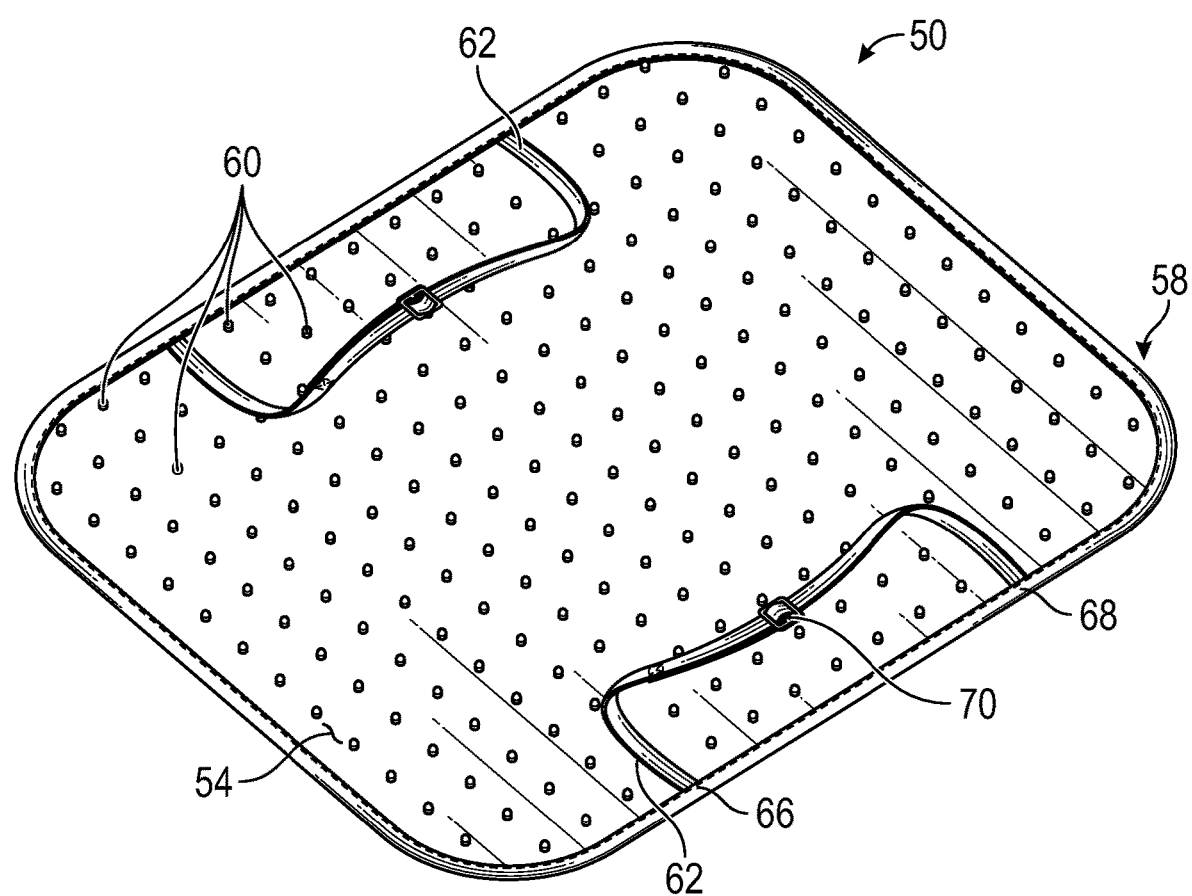
FIG. 6 is a bottom perspective view of a back floor mat of an embodiment of the disclosure.
Figure 7:
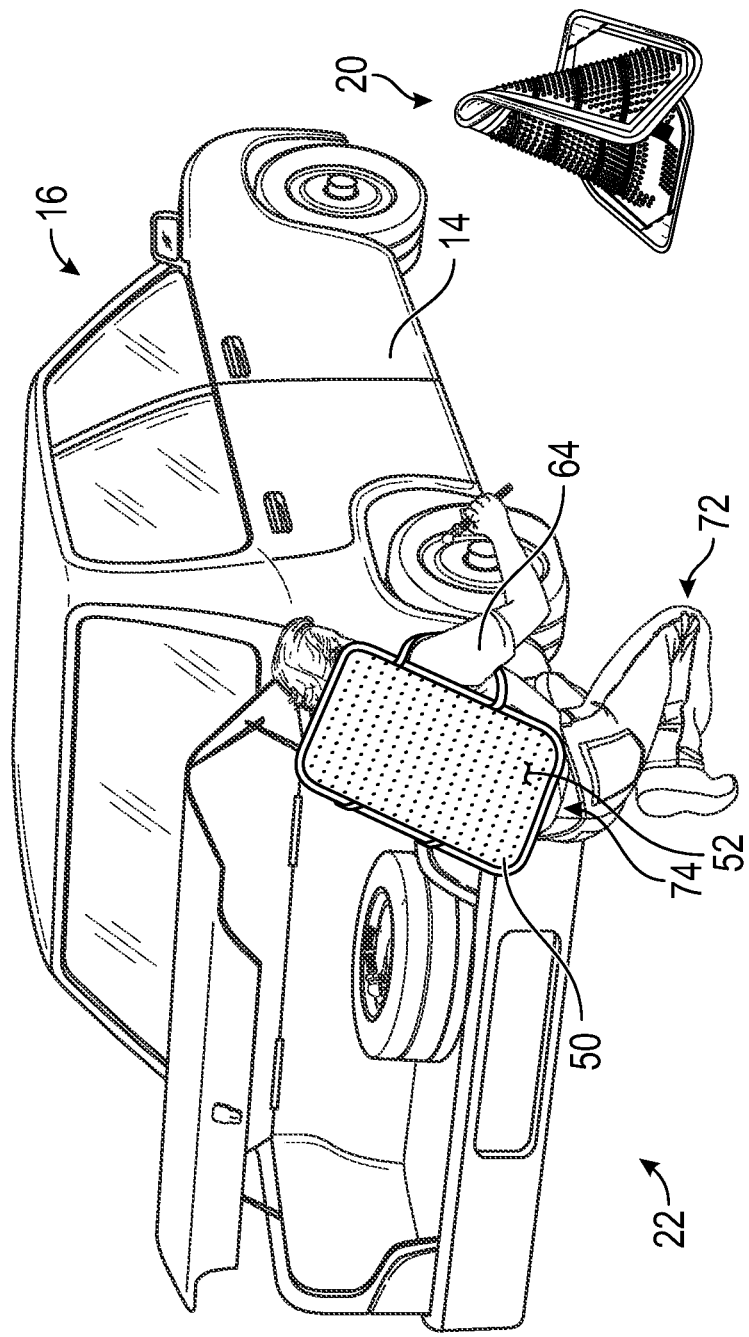
FIG. 7 is a perspective in-use view of an embodiment of the disclosure.

With reference now to the drawings, and in particular to FIGS. 1 through 7 thereof, a new floor mat device embodying the principles and concepts of an embodiment of the disclosure and generally designated by the reference numeral 10 will be described.

As best illustrated in FIGS. 1 through 7, the vehicle floor mat assembly 10 generally comprises a front floor mat 12 that is positionable on a floor 14 of a vehicle 16. The vehicle 16 may be a passenger vehicle, a cargo vehicle or any other motorized vehicle in which floor mats are commonly employed. The front floor mat 12 has a plurality of reflective elements 18 that is each integrated into the front floor mat 12. Each of the reflective elements 18 is comprised of a light reflective material to reflect light. The front floor mat 12 is rollable into a cone 20 having each of the plurality of reflective elements 18 being exposed. Furthermore, the cone 20 can be placed outside of the vehicle 16 when vehicle 16 is disabled on a roadway 22 thereby facilitating the reflective elements 18 to enhance visibility of the cone 20 for oncoming traffic. In this way the vehicle 16 is protected from being struck by oncoming traffic when the vehicle 16 breaks down on the shoulder of the road, for example.

The front floor mat 12 has a top surface 24, a bottom surface 26 and a perimeter edge 28 extending between the top surface 24 and the bottom surface 26 and the perimeter edge 28 has a front side 30, a back side 32, a first lateral side 34 and a second lateral side 36. The top surface 24 comprises a fibrous carpet and the bottom surface 26 comprises a plurality of cones 38 each comprised of a resiliently compressible material. The cones 38 are evenly distributed over the bottom surface 26 and the cones 38 penetrate into carpet on the floor 14 of the vehicle 16 to inhibit the front floor mat 12 from sliding on the carpet.

Each of the plurality of reflective elements 18 comprises a reflective strip 40 that is attached to the bottom surface 26 of the front floor mat 12. The reflective strip 40 associated with each of the plurality of reflective elements 18 extends substantially between the first lateral side 34 and the second lateral side 36 of the perimeter edge 28 of the front floor mat 12. Additionally, the reflective elements 18 are spaced apart from each other and are distributed along a partial distance between the front side 30 and the back side 32 of the perimeter edge 28. The bottom surface 26 may have a bright and highly contrasting color, such as red or orange, thereby enhancing visibility of the cone 20 during daylight hours.

The front floor mat 12 has a pair of grommets 42 each extending through the top surface 24 and the bottom surface 26. Each of the grommets 42 is spaced from an intersection between the back side 32 and a respective one of the first lateral side 34 and the second lateral side 36 of the perimeter edge 28 of the front floor mat 12. Additionally, each of the grommets 42 may accommodate a hook that is attached to the floor of the vehicle 16 or other type of securing device. A pair of weights 44 is each integrated into the front floor mat 12 to inhibit the front floor mat 12 from lifting from the floor 14 of the vehicle 16. Each of the weights 44 is aligned with a respective one of four corners 46 of the front floor mat 12 and each of the weights 44 is disposed on the bottom surface 26 of the front floor mat 12.

A fastener 48 is attached to the front floor mat 12 and the front floor mat 12 releasably engages the fastener 48 when the front floor mat 12 is folded into the cone 20 such that the fastener 48 retains the front floor mat 12 in the cone 20. The fastener 48 is disposed on the bottom surface 26 of the front floor mat 12 and the fastener 48 is oriented to extend along a line angling between the back side 32 and the second lateral side 36 of the perimeter edge 28 of the front floor mat 12. The fastener 48 is positioned closer to the second lateral side 36 than the back side 32. Additionally, the fastener 48 may comprise a hook portion of a hook and loop fastener which can engage the fibrous carpet on the top surface 24 of the front floor mat 12.

A back floor mat 50 is positionable on the floor 14 of the vehicle 16 and the back floor mat 50 has a reflective surface 52 comprised of a light reflecting material to reflect light. The back floor mat 50 has a lower surface 54, an upper surface 56 and an exterior edge 58 extending between the lower surface 54 and the upper surface 56. The upper surface 56 comprises a fibrous carpet and the lower surface 54 comprises a light reflecting material such that the lower surface 54 defines the reflective surface 52. The back floor mat 50 has a plurality of spikes 60 each extending away from the lower surface 54 to penetrate carpet on the floor of the vehicle 16 thereby inhibiting the back floor mat 50 from sliding on the carpet. The spikes 60 are evenly spaced apart from each other and are distributed over an entirety of the lower surface 54.

A pair of straps 62 is provided and each of the straps 62 is coupled to the back floor mat 50 such that each of the straps 62 forms a closed loop. In this way each of the straps 62 can be worn over a respective one of a user's shoulders 64 thereby facilitating the reflective surface 52 to enhance visibility of the user to oncoming traffic. Each of the straps 62 has a first end 66 that is coupled to the exterior edge 58 of the back floor mat 50 and a second end 68 that is coupled to the exterior edge 58 of the back floor mat 50. Each of the straps 62 is positioned on a respective one of a first lateral side 34 and a second lateral side 36 of the exterior edge 58. Additionally, each of the straps 62 has an adjuster 70 for adjusting a length of the straps 62 to accommodate a variety of sizes of users 72. Additionally, the lower surface 54 of the back floor mat 50 may have a bright and highly contrasting color, such as red or orange, to enhance visibility of the lower surface 54 during daylight hours.

In use, the front floor mat 12 is removed from the floor 14 of the vehicle 16 and the second lateral side 36 of the perimeter edge 28 of the front floor mat 12 is rolled onto itself having the top surface 24 of the front floor mat 12 engaging the fastener 48. In this way the front floor mat 12 is rolled into the cone 20 having the reflective strips 40 being exposed. Thus, the cone 20 can be placed on the roadway 22 adjacent to the vehicle 16 to direct traffic away from the vehicle 16. Furthermore, the reflective strips 40 enhance visibility of the cone 20 during evening and nighttime. The back floor mat 50 is removed from the floor 14 of the vehicle 16 and each of the straps 62 is worn over the user's shoulders 64 such that the lower surface 54 of the back floor mat 50 is exposed on the user's back 74. In this way the user 72 is highly visible to oncoming traffic thereby facilitating the user 72 to safely manage the mechanical problem on the vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle floor mat assembly being formable into reflective traffic signals for directing traffic around a disabled vehicle, said assembly comprising:
    a front floor mat being positionable on a floor of a vehicle, said front floor mat having a plurality of reflective elements each being integrated into said front floor mat, each of said reflective elements being comprised of a light reflective material wherein said plurality of reflective elements is configured to reflect light, said floor mat being rollable into a cone having each of said plurality of reflective elements being exposed wherein said cone is configured to be placed outside of the vehicle when vehicle is disabled on a roadway thereby facilitating said reflective elements to enhance visibility of said cone for oncoming traffic;

a pair of weights, each of said weights being integrated into said front floor mat wherein each of said weights is configured to inhibit said front floor mat from lifting from the floor of the vehicle;

a fastener being attached to said front floor mat, said front floor mat releasably engaging said fastener when said front floor mat is folded into said cone such that said fastener retains said front floor mat in said cone;

a back floor mat being positionable on the floor of the vehicle, said back floor mat have a reflective surface being comprised of a light reflecting material wherein said reflective surface is configured to reflect light; and a pair of straps, each of said straps being coupled to said back floor mat such that each of said straps forms a closed loop wherein each of said straps is configured to be worn over a respective one of a user's shoulders thereby facilitating said reflective surface to enhance visibility of the user to oncoming traffic.

2. The assembly according to claim 1, wherein:

said front floor mat has a top surface, a bottom surface and a perimeter edge extending between said top surface and said bottom surface, said perimeter edge having a front side, a back side, a first lateral side and a second lateral side;

said top surface comprises a fibrous carpet;

said bottom surface comprises a plurality of cones each being comprised of a resiliently compressible material, said plurality of cones being evenly distributed over said bottom surface wherein said plurality of cones is configured to penetrate into carpet on the floor of the vehicle to inhibit said front floor mat from sliding on the carpet; and each of said plurality of reflective elements comprises a reflective strip being attached to said bottom surface.

3. The assembly according to claim 2, wherein:

said reflective strip associated with each of said plurality of reflective elements extends substantially between said first lateral side and said second lateral side of said perimeter edge of said front floor mat; and said plurality of reflective elements is spaced apart from each other and is distributed along a partial distance between said front side and said back side of said perimeter edge.

4. The assembly according to claim 2, wherein said front floor mat has a pair of grommets each extending through said front surface and said back surface, each of said grommets being spaced from an intersection between said back side and a respective one of said first lateral side and said second lateral side of said perimeter edge of said front floor mat.

5. The assembly according to claim 2, wherein each of said weights is aligned with a respective one of four corners of said front floor mat, each of said weights being disposed on said bottom surface of said front floor mat.

6. The assembly according to claim 2, wherein said fastener is disposed on said bottom surface of said front floor mat, said fastener being oriented to extend along a line angling between said back side and said second lateral side of said perimeter edge of said front floor mat, said fastener being positioned closer to said second lateral side than said back side.

7. The assembly according to claim 1, wherein:

said back floor mat has a lower surface, an upper surface and an exterior edge extending between said lower surface and said upper surface;

said upper surface comprising a fibrous carpet; and said lower surface comprising a light reflecting material such that said lower surface defines said reflective surface.

8. The assembly according to claim 1, wherein:

said back floor mat has a lower surface; and said back floor mat has a plurality of spikes each extending away from said lower surface wherein each of said plurality of spikes is configured to penetrate carpet on the floor of the vehicle to inhibit said back floor mat from sliding on the carpet, said spikes being evenly spaced apart from each other and distributed over an entirety of said lower surface.

9. The assembly according to claim 1, wherein:

said back floor mat has an exterior edge, said exterior edge having a first lateral side and a second lateral side; and each of said straps has a first end being coupled to said exterior edge of said back floor mat and a second end being coupled to said exterior edge of said back floor mat, each of said straps being positioned on a respective one of said first lateral side and said second lateral side of said exterior edge, each of said straps having an adjuster for adjusting a length of said straps wherein said straps are configured to accommodate a variety of sizes of users.

10. A vehicle floor mat assembly being formable into reflective traffic signals for directing traffic around a disabled vehicle, said assembly comprising:

a front floor mat being positionable on a floor of a vehicle, said front floor mat having a plurality of reflective elements each being integrated into said front floor mat, each of said reflective elements being comprised of a light reflective material wherein said plurality of reflective elements is configured to reflect light, said floor mat being rollable into a cone having each of said plurality of reflective elements being exposed wherein said cone is configured to be placed outside of the vehicle when vehicle is disabled on a roadway thereby facilitating said reflective elements to enhance visibility of said cone for oncoming traffic, said front floor mat having a top surface, a bottom surface and a perimeter edge extending between said top surface and said bottom surface, said perimeter edge having a front side, a back side, a first lateral side and a second lateral side, said top surface comprising a fibrous carpet, said bottom surface comprising a plurality of cones each being comprised of a resiliently compressible material, said plurality of cones being evenly distributed over said bottom surface wherein said plurality of cones is configured to penetrate into carpet on the floor of the vehicle to inhibit said front floor mat from sliding on the carpet, each of said plurality of reflective elements comprising a reflective strip being attached to said bottom surface, said reflective strip associated with each of said plurality of reflective elements extending substantially between said first lateral side and said second lateral side of said perimeter edge of said front floor mat, said plurality of reflective elements being spaced apart from each other and being distributed along a partial distance between said front side and said back side of said perimeter edge, said front floor mat having a pair of grommets each extending through said front surface and said back surface, each of said grommets being spaced from an intersection between said back side and a respective one of said first lateral side and said second lateral side of said perimeter edge of said front floor mat;

a pair of weights, each of said weights being integrated into said front floor mat wherein each of said weights is configured to inhibit said front floor mat from lifting from the floor of the vehicle, each of said weights being aligned with a respective one of four corners of said front floor mat, each of said weights being disposed on said bottom surface of said front floor mat;

a fastener being attached to said front floor mat, said front floor mat releasably engaging said fastener when said front floor mat is folded into said cone such that said fastener retains said front floor mat in said cone, said fastener being disposed on said bottom surface of said front floor mat, said fastener being oriented to extend along a line angling between said back side and said second lateral side of said perimeter edge of said front floor mat, said fastener being positioned closer to said second lateral side than said back side;

a back floor mat being positionable on the floor of the vehicle, said back floor mat have a reflective surface being comprised of a light reflecting material wherein said reflective surface is configured to reflect light, said back floor mat having a lower surface, an upper surface and an exterior edge extending between said lower surface and said upper surface, said upper surface comprising a fibrous carpet, said lower surface comprising a light reflecting material such that said lower surface defines said reflective surface, said back floor mat having a plurality of spikes each extending away from said lower surface wherein each of said plurality of spikes is configured to penetrate carpet on the floor of the vehicle to inhibit said back floor mat from sliding on the carpet, said spikes being evenly spaced apart from each other and distributed over an entirety of said lower surface; and a pair of straps, each of said straps being coupled to said back floor mat such that each of said straps forms a closed loop wherein each of said straps is configured to be worn over a respective one of a user's shoulders thereby facilitating said reflective surface to enhance visibility of the user to oncoming traffic, each of said straps having a first end being coupled to said exterior edge of said back floor mat and a second end being coupled to said exterior edge of said back floor mat, each of said straps being positioned on a respective one of a first lateral side and a second lateral side of said exterior edge, each of said straps having an adjuster for adjusting a length of said straps wherein said straps are configured to accommodate a variety of sizes of users.

* * * * *